2 Sheets—Sheet 1.
AULTMAN & MILLER.
Mowing Machine.
No. 772.
Reissued July 19, 1859.
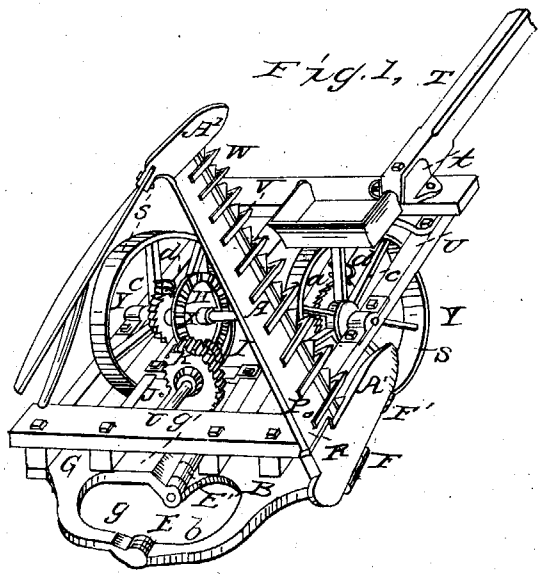
Fig. 1,
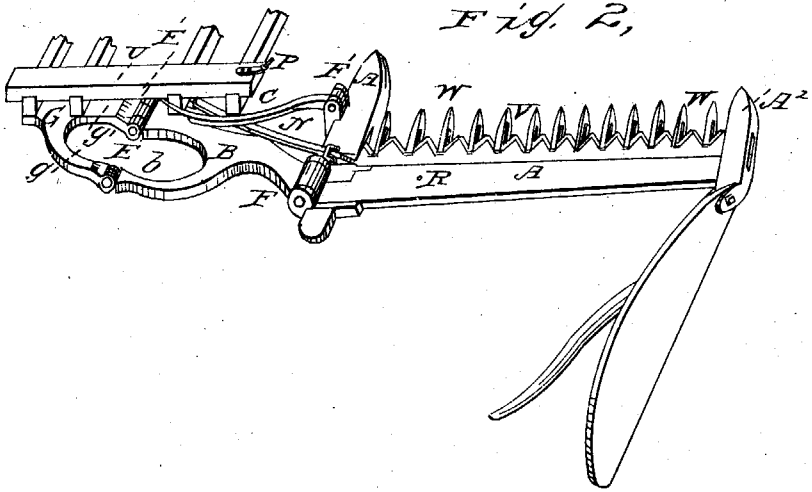
Fig. 2,
N. PETERS, Photo-Lithographer, Washington, D. C.

2 Sheets—Sheet 2.
AULTMAN & MILLER.
Mowing Machine.
No. 772.
Reissued July 19, 1859.
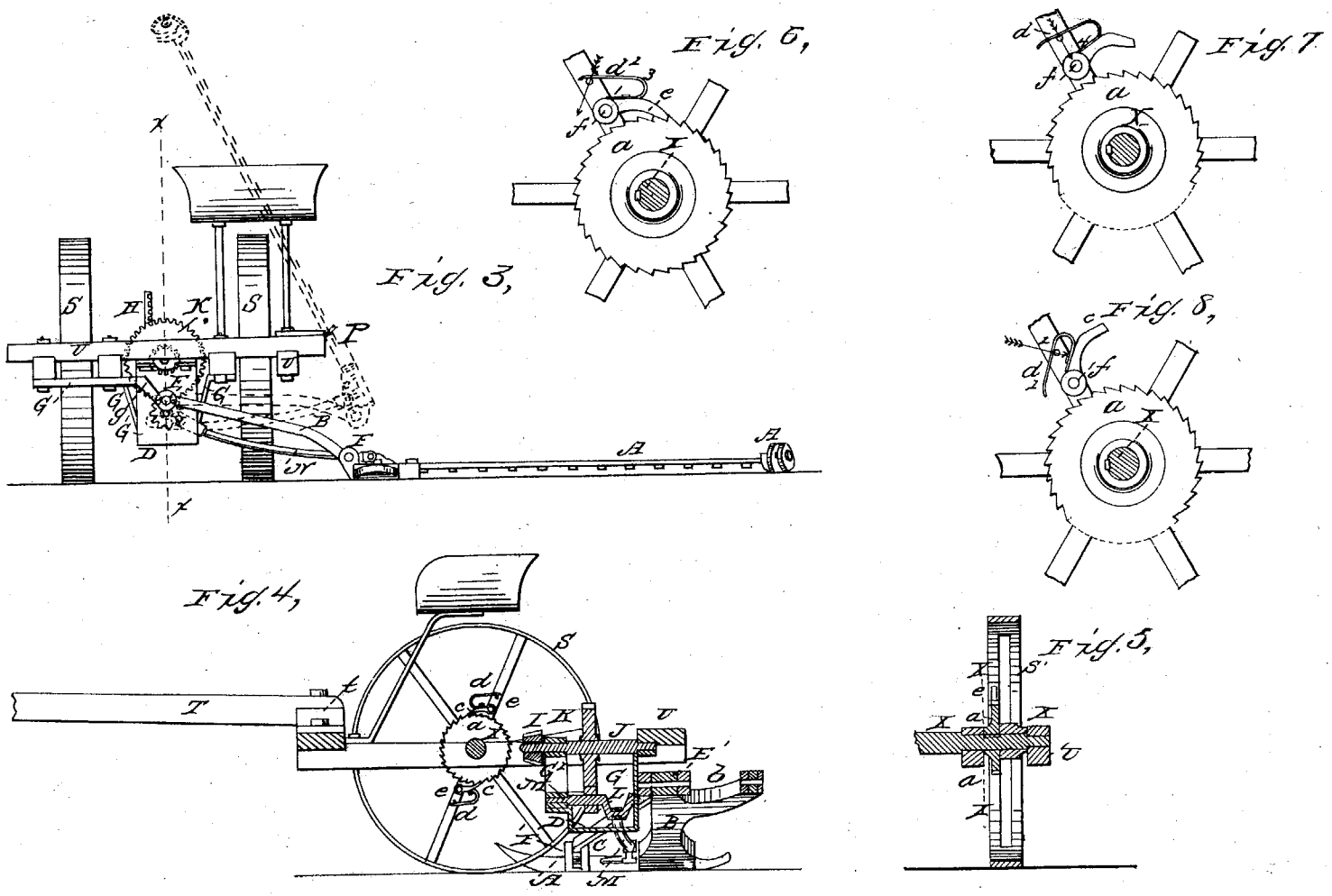
N. PETERS, Photo-Lithographer, Washington, D. C.

UNITED STATES PATENT OFFICE.

C. AULTMAN AND LEWIS MILLER, OF CANTON, OHIO, ASSIGNORS, BY MESNE ASSIGNMENTS, TO C. AULTMAN & CO.

IMPROVEMENT IN MOWING-MACHINES.

Specification forming part of Letters Patent No. 15,160, dated June 17, 1856; Reissue No. 772, dated July 19, 1859.

DIVISION B².

*To all whom it may concern:*

Be it known that we, CORNELIUS AULTMAN and LEWIS MILLER, both of Canton, in the county of Stark and State of Ohio, have invented an Improvement in Mowing-Machines, of which the following is a full, clear, and exact description, reference being had to the accompanying drawings, which make part of this specification, and in which—

Figure 1 represents a view in perspective of a mowing-machine which embraces our improvements, the finger-beam and cutter being raised on end and leaned against the side of the frame to adapt the machine to being drawn to or from the place of mowing. Fig. 2 represents a like view of the rear portion of the machine with the finger-beam extended upon the ground ready for mowing. Fig. 3 represents an elevation of the rear of the machine, showing particularly the relative positions of the parts when the finger-beam is down on the ground ready for work and when it is raised for transportation. Fig. 4 represents a section of the machine on the right of the line *x x* of Fig. 3. Fig. 5 represents an axial vertical section through one of the supporting-wheels, one of the ratchet-wheels, and that end of the axle on which these wheels are mounted, and a transverse section of those portions of the frame which are cut by the plane of the section through the wheel and axle. Fig. 6 represents a transverse section at the line *x x* of Fig. 5, and an elevation of the parts to the right of that line, except the frame and the rim and the outer ends of the spokes of the driving-wheel, showing particularly the relative position of the spring and pawl with the other parts when the pawl is in gear with the ratchet-teeth. Fig. 7 represents the same view of the parts shown in Fig. 6, but with the spring and pawl in a second and different position from the one shown in that figure; and Fig. 8 represents the same view of the parts shown in Fig. 6, but with the spring and pawl in a third position, different from those shown in Figs. 6 and 7.

We term that side of the machine the "right" side which would be at the right hand of a person behind the machine and looking toward it, and the opposite side of the machine we term its "left" side.

In machines for mowing in which, like ours, the cutting apparatus is drawn by a yielding coupling-arm attached to the main frame it has been found necessary to support the coupling-arm by a yielding brace. The brace, however, did not work satisfactorily, because, as we have discovered, of its hinge or axis of motion not being in a line with that of the arm, and consequently giving to the latter, while being raised and lowered, a horizontal vibrating movement, also, which imparted to the finger-beam a corresponding movement. This want of coincidence with a common line of the axis of the hinges of the brace and coupling-arm likewise involved a degree of looseness in the hinges which connected the coupling-arm with the finger-beam and main frame highly objectionable, as it prevented the hinges from being as strong as they would have been if the joints had been close, and the play in the joints allowed the jolting and swaying movements of the main frame and of the finger-beam to vibrate the cutter independently of the crank, sometimes moving it in the same direction as the crank and elongating its stroke, and at other times moving it in opposition to the crank, in a measure neutralizing the crank motion and curtailing the stroke of the cutter. These irregularities produce very serious difficulties in the cutting, as the angular projecting blades of the cutter are so many vibrating shear-blades, which act in connection with a corresponding number of stationary blades, (in this case the sides of the guard-fingers,) and in order that these shears may cut to the best advantage the vibrations must be uniform and of such length that the cutting-edges will be alternately separated to the maximum extent to receive between them the stalks to be severed, and then brought together to effect their severance. If the vibration is not long enough, the edges of the shears will not come together, and of course will not cut the stalks between them. If the vibration is too long, the edges will pass each other, and on the return vibration will not be separated sufficiently to admit the stalks between them, and therefore will fail to cut them. With a view to avoid these difficulties we have made close-fitting joints between the coupling-arm and the finger-beam and the main frame, and have arranged the hinge of the brace-bar for supporting the coupling-arm to the main frame in a line with the hinge of the coupling-arm, and this improvement is the invention which we claim under this patent.

The accompanying drawings represent a mowing-machine in which the main frame U is supported on two large wheels, S S′, in the manner of a cart, and has a tongue, T, projecting forward, by which the horses draw and guide the machine.

The gearing for vibrating the cutter derives its motion from one or both of the wheels S S′, and consists of a bevel-wheel, H, on the axle of the large wheels, which drives a bevel-pinion, I, on a counter-shaft, J, that carries a spur-wheel, K, which gears into a pinion, L, on a third shaft, M, carrying a crank, M′, that, through a connecting-rod, N, communicates a vibrating motion to the cutter V, which plays through guard-fingers W, projecting in front of the finger-beam.

To the under side of the main frame a strong bracket, G, is firmly secured. This bracket has two branches, *g g′*, one of which, *g′*, is jointed to the coupling-arm B by a hinge, E′, and the other, *g*, is jointed by a hinge, E, to a brace, *b*, for supporting the coupling-arm against the horizontal strains to which it is subjected.

The axis of the hinge of the brace and that of the coupling-arm are in the same line, and both will therefore turn as if on a common hinge.

The right end of the coupling-arm is hinged to the shoe A′, to which the finger-beam A is firmly secured.

What we claim under this patent as our invention is—

The combination, with the hinged coupling-arm, of a hinged brace whose axis of motion at the end next the main frame coincides with that of the corresponding end of the coupling-arm, substantially as herein set forth.

In testimony whereof we have hereunto subscribed our names.

CORNELIUS AULTMAN.
LEWIS MILLER.

Witnesses:
DANIEL TONNER,
FRED ORTH.